US009688545B2

(12) United States Patent
Li

(10) Patent No.: US 9,688,545 B2
(45) Date of Patent: Jun. 27, 2017

(54) WATER FILTER WITH FILTER CARTRIDGE BLOCK ALERTING AND ALERTING METHOD

(71) Applicant: SHENZHEN XINGRISHENG INDUSTRIAL CO., LTD., Shenzhen, Guangdong Province (CN)

(72) Inventor: Liedang Li, Shenzhen (CN)

(73) Assignee: SHENZHEN XINGRISHENG INDUSTRIAL CO., LTD. (CN)

( * ) Notice: Subject to any disclaimer, the term of this patent is extended or adjusted under 35 U.S.C. 154(b) by 7 days.

(21) Appl. No.: 14/765,336

(22) PCT Filed: Sep. 26, 2013

(86) PCT No.: PCT/CN2013/084373
§ 371 (c)(1),
(2) Date: Aug. 2, 2015

(87) PCT Pub. No.: WO2015/042844
PCT Pub. Date: Apr. 2, 2015

(65) Prior Publication Data
US 2015/0376027 A1    Dec. 31, 2015

(51) Int. Cl.
*C02F 1/00*     (2006.01)
*A01K 63/04*    (2006.01)
*B01D 27/10*    (2006.01)
*C02F 103/20*   (2006.01)

(52) U.S. Cl.
CPC ............ *C02F 1/001* (2013.01); *A01K 63/045* (2013.01); *B01D 27/101* (2013.01); *C02F 2103/20* (2013.01); *C02F 2201/006* (2013.01); *C02F 2209/445* (2013.01)

(58) Field of Classification Search
CPC .................................................. B01D 27/101
See application file for complete search history.

(56) References Cited

U.S. PATENT DOCUMENTS

2010/0084347 A1* 4/2010 Wilder .................... C02F 1/003
                                                  210/717

* cited by examiner

*Primary Examiner* — Peter Keyworth
(74) *Attorney, Agent, or Firm* — PROI Intellectual Property US

(57) ABSTRACT

A water filter with alarm function for indicating blockage of a filter cartridge thereof and an alarm method are provided. The filter main body is provided with a filter cartridge and is arranged with a before-filtering water cavity. A filter upper cover covers the top of the filter main body. The before-filtering water cavity is accommodated with a floating-ball-type indicating apparatus, which comprises a floating ball, a connecting rod and a color scale. The connecting rod is mounted rotatably on an inner surface of the filter upper cover with the aid of a hinge support. The floating ball is arranged at the front end of the connecting rod. The color scale is also arranged on the connecting rod. A transparent visual cover that matches with the color scale is arranged on the upper surface of the filter upper cover.

11 Claims, 8 Drawing Sheets

WATER FILTER WITH FILTER CARTRIDGE BLOCK ALERTING AND ALERTING METHOD

CROSS REFERENCE TO RELATED APPLICATIONS

The present application is the US national stage of International Patent Application PCT/CN2013/084373 filed on Sep. 26, 2013.

TECHNICAL FIELD

The invention relates to a water filtration device for aquatic breeding, especially relates to the real time indication of the filtration state of the said water filtration device, particularly relates to a plug-in water filter with alarm for its cartridge blocked up and alarm method.

BACKGROUND ART

Water filter for aquatic breeding with prior art aims to purify the water body in the aquarium, assure the water quality of the water body is pure and fit for the healthy growth of ornamental fishes. As for water circulation system of the aquarium with prior art, its polluted water is pumped into the said water filter, and is filtered by the filter cartridge inside of the filter, and then purified water reflows from the water outlet to the aquarium. As is generally known, the critical component of the water filter is the filter cartridge, which intercepts and hold on suspended solid particles in the water, and serves the main task of filtering and purifying the water body, So, the filter cartridge will be saturated after a period of use, resulting in a great weakening of the filtration and purification function. Therefore, the filter cartridge has definite duration of usage and definite load limit. To play the maximum efficacy of the said water filter, any filter cartridge must be replaced when saturated or after a period of use. Nevertheless, the water filter can't remind consumers to replace the filter cartridge in due time, there is often the problem of poor water quality, affecting the growth and survival of the ornamental fishes, or waste due to prematurely replacement of the filter cartridge.

CONTENT OF THE INVENTION

The technical problem the invention aims to settle lies in avoiding the said deficiencies of the prior art so as to provide a water filter of simple construction which can remind consumers to replace the filter cartridge in due time and is provided with a filter with alarm for its cartridge blocked up and an alarm method. As is generally known, for the plug-in water filter applied to the aquarium, when the plug-in filter cartridge is inserted into the water filter and works, as the resistance of the said filter cartridge on the fluid is not great, difference of the water level between the before-filtering water cavity and the after-filtering water cavity is not great. However, if the said filter cartridge is saturated, namely blocked by solid particles or other pollutants, water level of the before-filtering water cavity will rise, accordingly such phenomenon is applied by us to alert the filter cartridge blocked up.

Technical solution adopted by the invention to solve the technical problem is a water filter adapted to provide an alarm upon blockage of a filter cartridge thereof, comprising a filter main body with a filter cartridge provided therein, a before-filtering water cavity, and a filter upper cover adapted to cover the top of the filter main body, wherein the before-filtering water cavity is accommodated with a floating-ball-type indicating apparatus, which comprises a floating ball, a connecting rod and a color scale, the connecting rod mounted rotatably on an inside vertical wall of the filter or an inner surface of the filter upper cover with the help of a hinge support, wherein the floating ball is arranged at the front end of the connecting rod, and the color scale is provided on the connecting rod; wherein a transparent visual cove that matches with the color scale is arranged on an upper surface of the filter upper cover.

The rear end of the connecting rod can be of a disc shape, surface of the disc being orthogonal with the water surface of the before-filtering water cavity, wherein the color scale is arranged on a section of an arc surface at the top edge of the disc; wherein the water filter is adapted such that, when the floating ball floats up and down along with the water level the color scale on the top edge arc surface of the disc rotates revealing an arc track along with the floating ball, when the floating ball is at a low water level, the color scale rotates and leaves the transparent visual cover, and when the floating ball is at a high water level, the color scale rotates into the visible range of the transparent visual cover.

Besides, the connecting rod can also be entirely rod-shaped, with the aid of a hinge joint located at the rod root, the said color scale is arranged on the arc strut connected to the connecting rod, when the floating ball is at the low water level, the color scale leaves the transparent visual cover, when the floating ball is at the high water level, the color scale enters the visible range of the transparent visual cover.

The water filter can be a plug-in one, and the filter cartridge is a water filtration piece shaped like a plug-in card.

When the filter cartridge is not blocked up and works normally, water level of the before-filtering water cavity is relatively low, the floating ball is at the low level, and the color scale leaves the transparent visual cover, enabling the transparent visual cover to have no alerting color.

When the filter cartridge is blocked up, saturated and works abnormally, water level of the before-filtering water cavity rises, the floating ball rises to the high level, the color scale is close to or shifted to the visible range of the transparent visual cover, so as to enable the transparent visual cover to display the alerting color, and remind the user to replace the filter cartridge.

Technical solution adopted by the invention to solve the said technical issues can also be a method of enabling a water filter to provide alarm for indicating blockage of a filter cartridge thereof, wherein the water filter comprises a filter main body with the replaceable filter cartridge provided therein, a before-filtering water cavity arranged at a water inlet of the filter cartridge, water level of the before-filtering water cavity rises due to the blockage of the filter cartridge; the method comprising the following steps, A. The before-filtering water cavity is accommodated with a floating-ball-type indicating apparatus, which comprises a floating ball, a connecting rod and a color scale, wherein the connecting rod is mounted rotatably on an inside vertical wall of the filter main body or an inner surface of the filter upper cover with the help of a hinge support, wherein the floating ball is arranged at the front end of the connecting rod, and the color scale is provided on the connecting rod;

B. Arranging a transparent visual cover that matches with the color scale 23 on an upper surface of the filter upper cover;

C. When the color scale is observed through the transparent visual cover from the outside of the filter upper cover, it means that the filter cartridge is blocked up and shall be replaced.

Usually, said color scale is red.

Compared with prior art, beneficial effects of the invention are, simple in structure, can remind users to replace the filter cartridge in due time, and save the usage cost.

Figure 1:
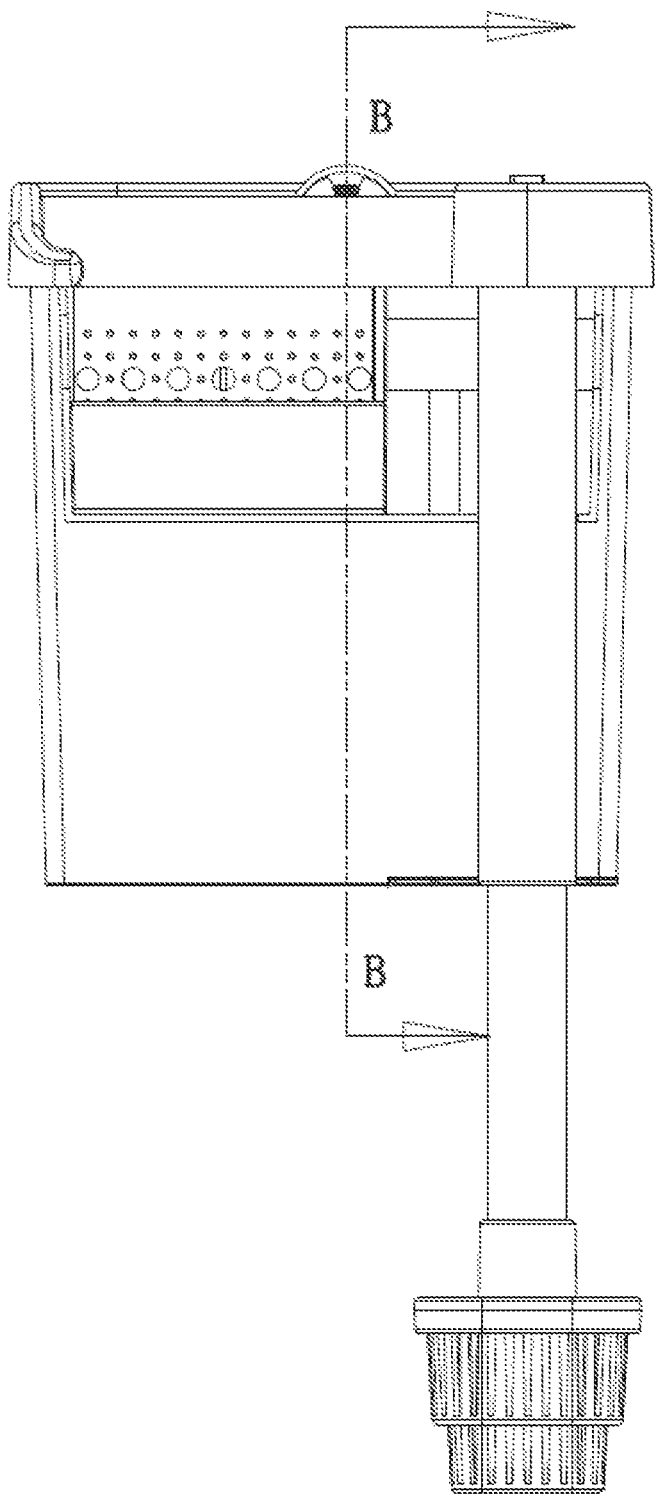
FIG. 1 shows an orthogonal projection front view diagram of the first embodiment of the water filter with alarm for its filter cartridge blocked up for the invention.
Figure 2:
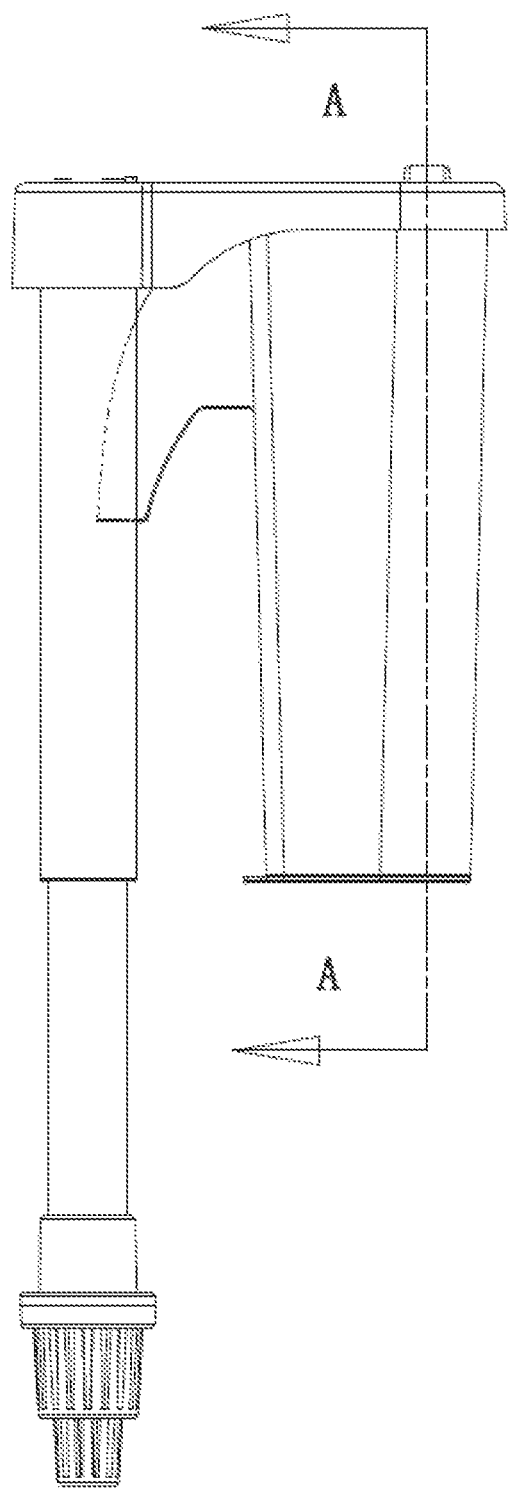
FIG. 2 shows a right view of FIG. 1.
Figure 3:
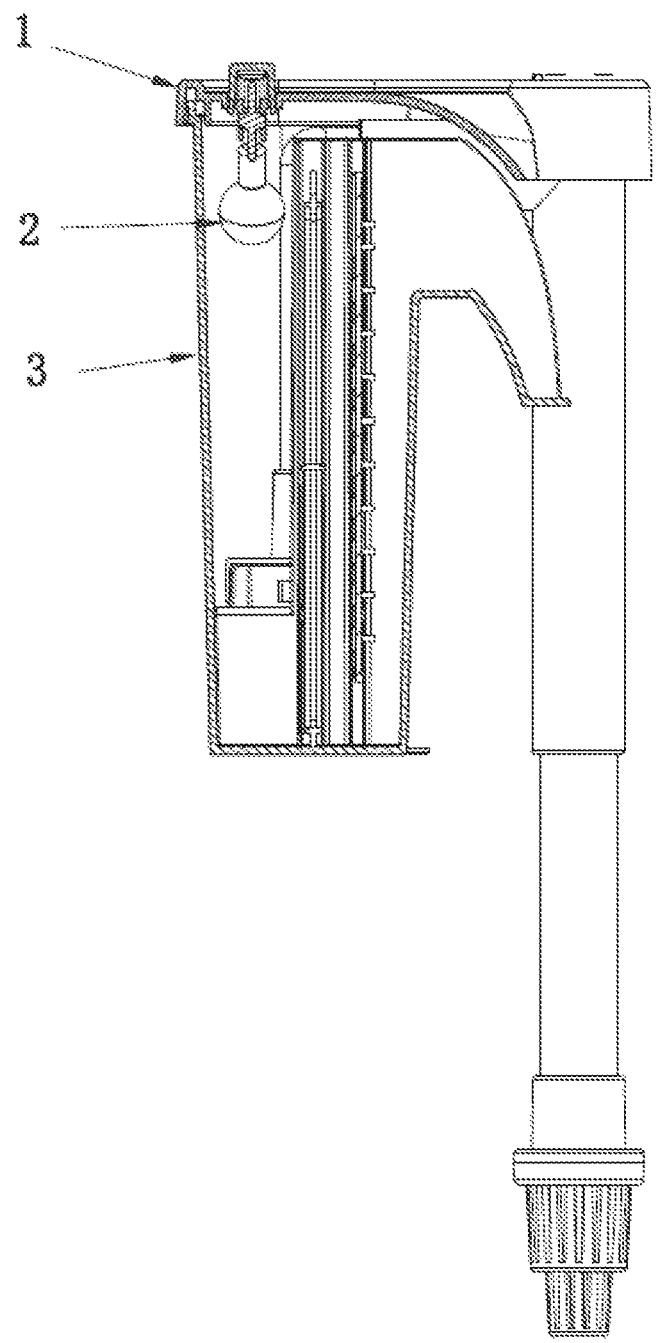
FIG. 3 shows a B-B sectional view of FIG. 1.

In the Figure: 1 is a filter upper cover, 11 is a transparent visual cover, 12 is a hinge support, 2 is a floating-ball-type indicating apparatus, 21 is a floating ball, 22 is a connecting rod, 23 is a color scale, 24 is an arc strut, 3 is a filter main body, 31 is a before-filtering water cavity, 4 is a filter cartridge, H1 is a water level of the before-filtering water cavity when the filter cartridge is normally used, and H2 is a water level of the before-filtering water cavity when the filter cartridge is blocked up.

DETAILED EMBODIMENTS

Following, the invention is further described with combination of the figures.

See the figures, as to the water filter adapted to provide an alarm upon blockage of filter cartridge of the invention, comprising a filter main body 3 with a filter cartridge 4 provided therein, a before-filtering water cavity 31, and a filter upper cover 1 adapted to cover the top of the filter main body 3, what is different from the prior art is that: the before-filtering water cavity 31 is accommodated with a floating-ball-type indicating apparatus 2, which comprises a floating ball 21, a connecting rod 22 and a color scale 23. The connecting rod 22 mounted rotatably on an inside vertical wall of the filter or an inner surface of the filter upper cover 1 with the help of a hinge support 12, wherein the floating ball 21 is arranged at the front end of the connecting rod 22, and the color scale 23 is provided on the connecting rod 22; wherein a transparent visual cover 11 that matches with the color scale 23 is arranged on an upper surface of the filter upper cover 1.

In the various embodiments of the invention, the water filter is a plug-in water one, the filter cartridge 4 is a water filtration piece shaped like a plug-in card.

Figure 4:
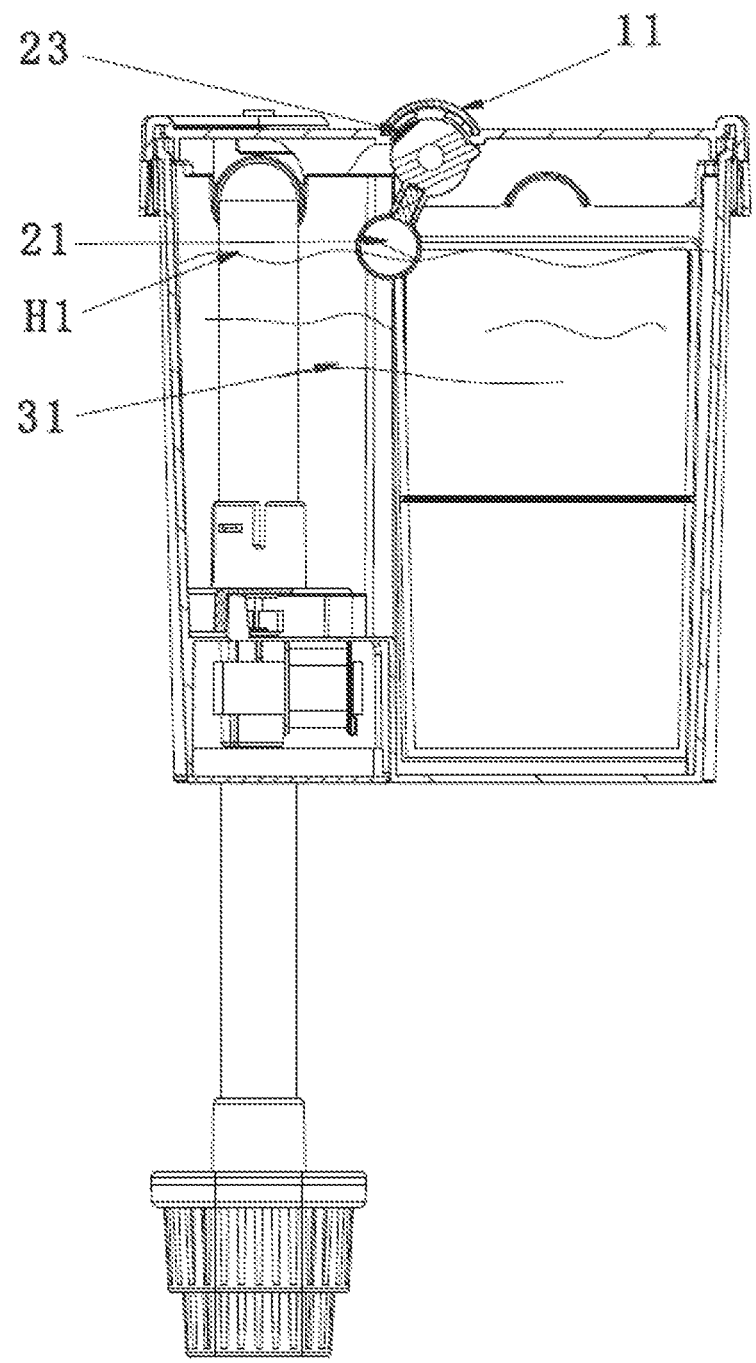
FIG. 4 shows a state diagram of an A-A sectional view of FIG. 2 when the filter cartridge is not blocked up.
Figure 5:
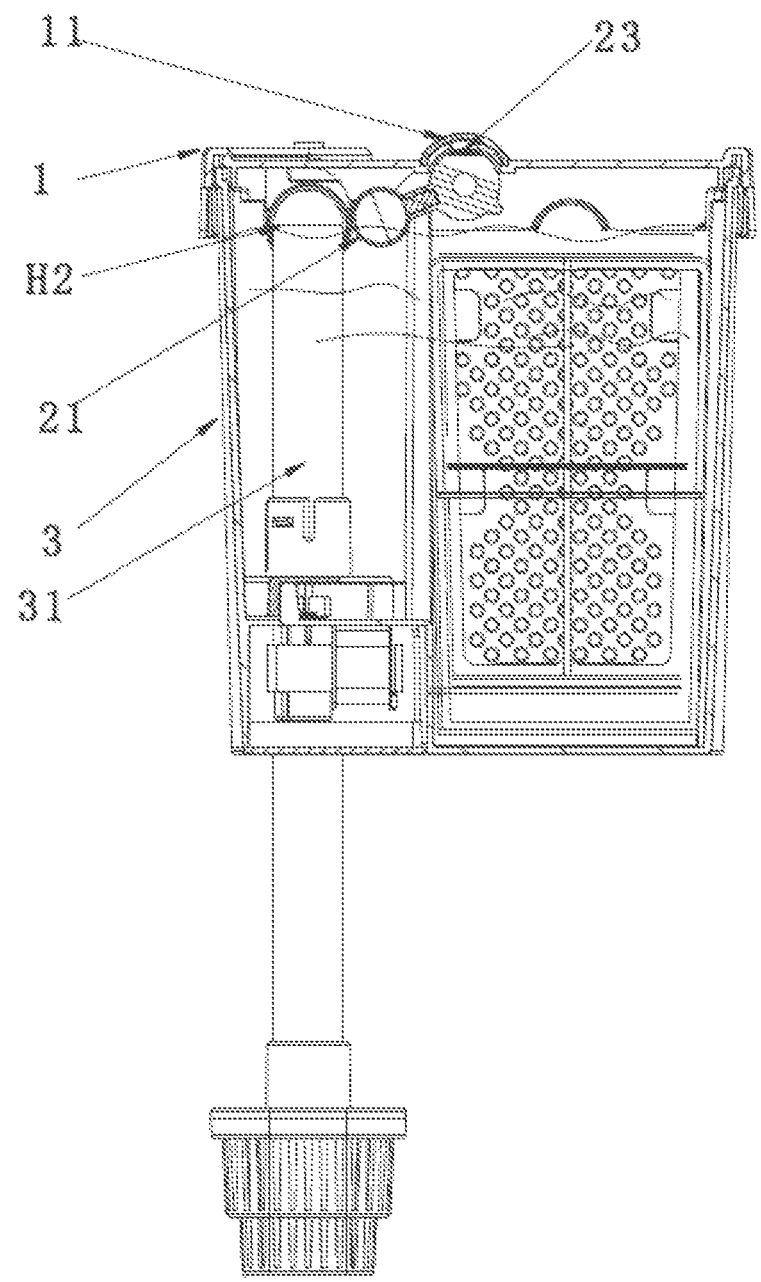
FIG. 5 shows a state diagram of an A-A sectional view of FIG. 2 when the filter cartridge is blocked up.

See FIG. 4 and FIG. 5, in the first embodiment of the invention, the rear end of the connecting rod 22 is disc-shaped, surface of the disc being orthogonal with the water surface of the before-filtering water cavity 31; wherein the color scale 23 is arranged on a section of an arc surface at the top edge of the disc; wherein the water filter is adapted such that, when the floating ball 21 floats up and down along with the water level, the color scale 23 on the top edge arc surface of the disc rotates revealing an arc track along with the floating ball 21. When the floating ball 21 is at a low water level H1, the color scale 23 rotates and leaves the transparent visual cover 11, and when the floating ball 21 is at a high water level H2 the color scale 23 rotates to the visible range of the transparent visual cover 11.

Figure 6:
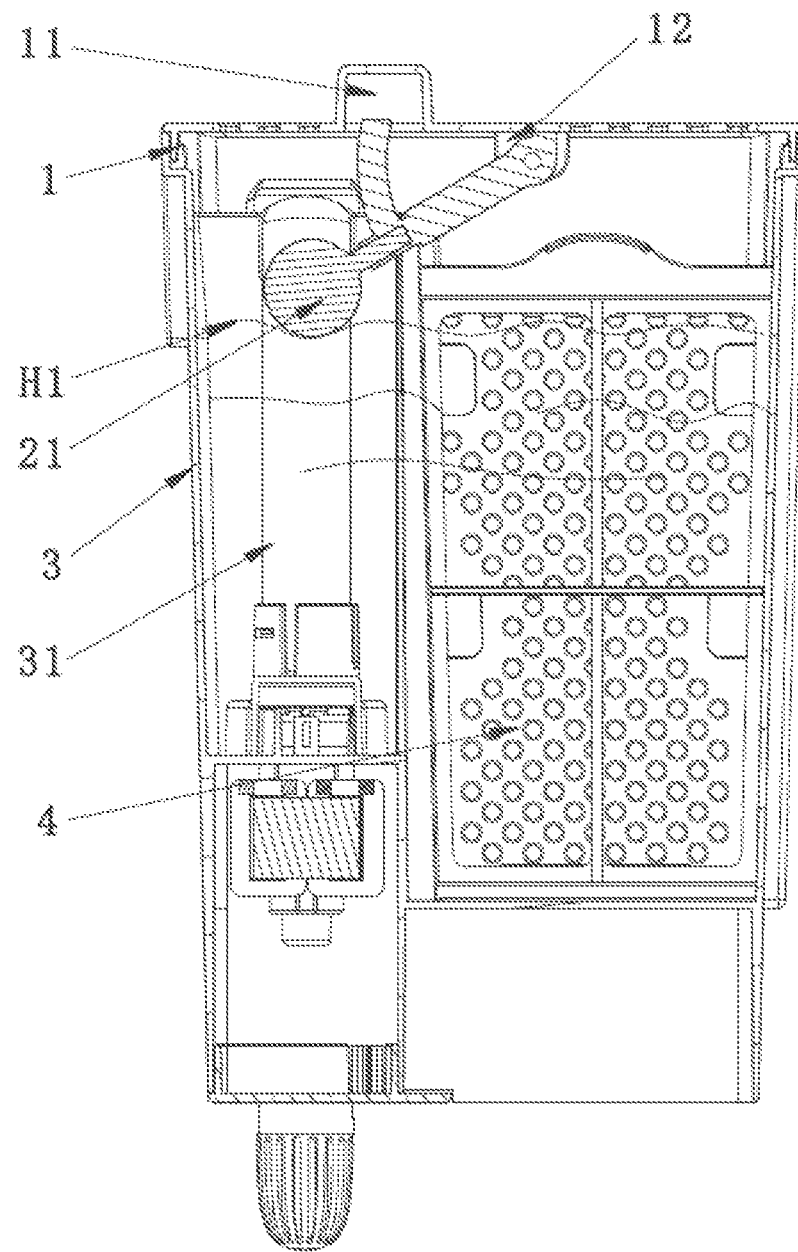
FIG. 6 shows an internal structure diagram of the second embodiment of the water filter with alarm for its filter cartridge blocked up for the invention.
Figure 7:
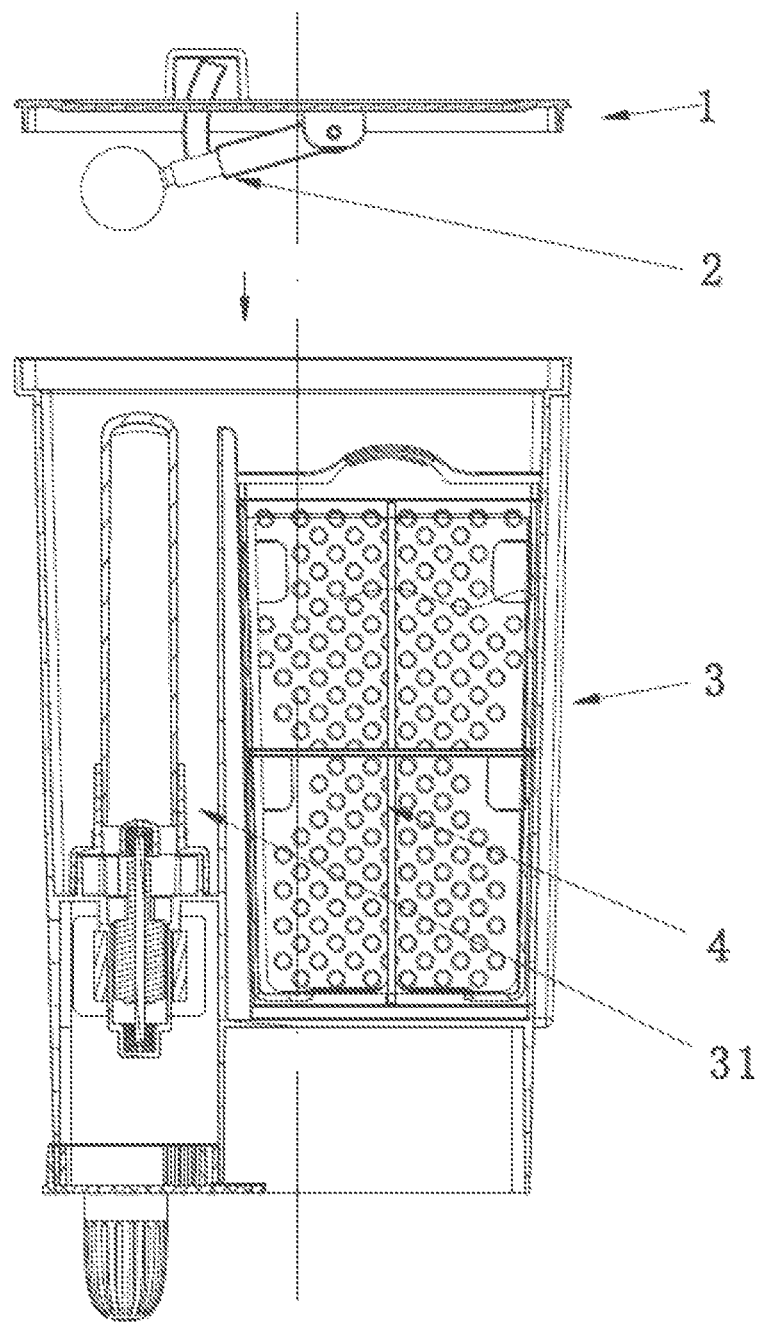
FIG. 7 shows an installation diagram of the floating-ball-type indicating apparatus 2 of the said second embodiment.
Figure 8:
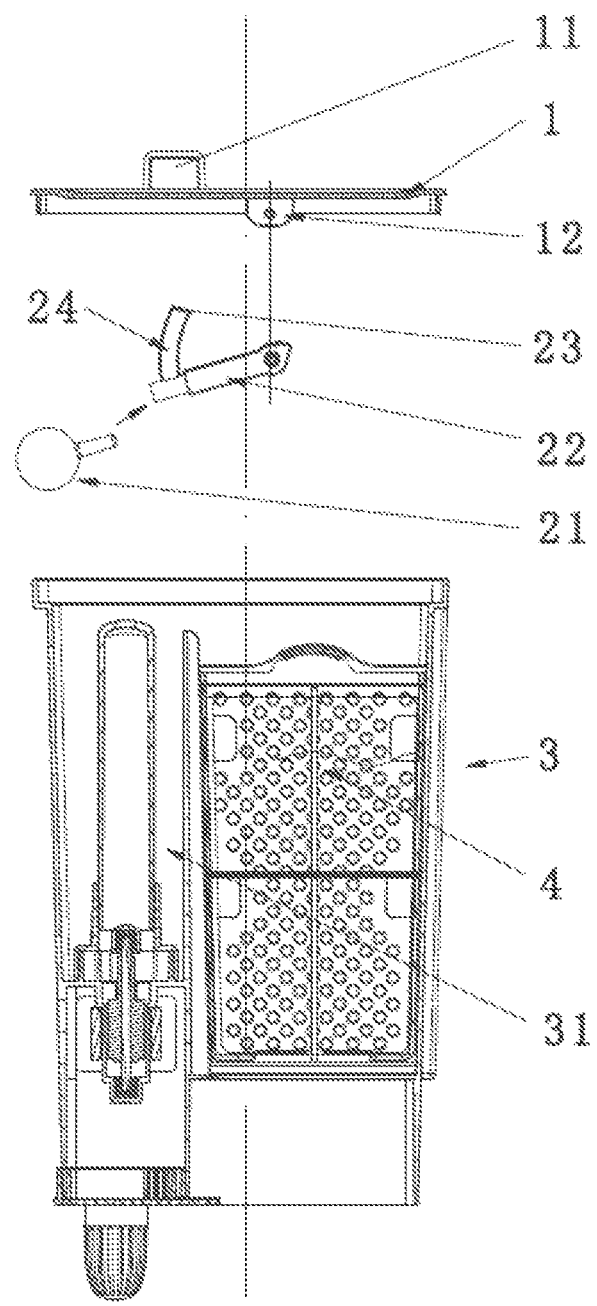
FIG. 8 shows a structure decomposition diagram of the floating-ball-type indicating apparatus 2 of the said second embodiment.

See FIG. 6 to FIG. 8, in the second embodiment of the invention, the connecting rod 22 is entirely rod-shaped, with the aid of a hinge joint located at its root, the said color scale 23 is arranged on the arc strut 24 connected with the connecting rod 22, when the floating ball 21 is at the low water level H1, the color scale 23 leaves the transparent visual cover 11; when the floating ball 21 is at the high water level H2, the color scale 23 enters the visible range of the transparent visual cover 11.

When the filter cartridge 4 is not blocked up and works normally, water level H1 of the before-filtering water cavity 31 is relatively low, the floating ball 21 is at the low level, and the color scale 23 leaves the transparent visual cover 11, enabling the transparent visual cover 11 to have no alerting color.

When the filter cartridge 4 is blocked up, saturated and works abnormally, water level H2 of the before-filtering water cavity 31 rises, the floating ball 21 rises to the high level, the color scale 23 is close to or shifted into the transparent visual cover 11, enabling the transparent visual cover 11 to display the alerting color.

A method of the invention to enable a water filter to provide alarm for indicating blockage of a filter cartridge thereof, wherein the water filter comprises a filter main body 3 with the replaceable filter cartridge 4 provided therein, a before-filtering water cavity 31 arranged at a water inlet of the filter cartridge 4, water level of the before-filtering water cavity 31 rises due to the blockage of the filter cartridge 4; the method comprising the following steps:

A. The before-filtering water cavity 31 is accommodated with a floating-ball-type indicating apparatus 2, which comprises a floating ball 21, a connecting rod 22 and a color scale 23, wherein the connecting rod 22 is mounted rotatably on an inside vertical wall of the filter main body 3 or an inner surface of the filter upper cover 1 in with the help of a hinge support 12, wherein the floating ball 21 is arranged at the front end of the connecting rod 22, and the color scale is provided on the connecting rod 22;

B. Arranging a transparent visual cover 11 that matches with the color scale 23 on the upper surface of the filter upper cover 1;

C. When the color scale 23 is observed through the transparent visual cover 11 from the outside of the filter upper cover 1, it means that the filter cartridge 4 is blocked up and shall be replaced. Usually, the said color scale 23 is red.

What is claimed is:

1. A water filter adapted to provide an alarm upon blockage of filter cartridge thereof, comprising a filter main body with a filter cartridge provided therein, a before-filtering water cavity, and a filter upper cover adapted to cover the top of the filter main body, wherein, the before-filtering water cavity is accommodated with a floating-ball-type indicating apparatus, which comprises a floating ball, a connecting rod and a color scale, the connecting rod mounted rotatably on an inside vertical wall of the filter or an inner surface of the filter upper cover with the help of a hinge support, wherein the floating ball is arranged at the front end of the connecting rod, and the color scale is provided on the connecting rod; wherein a transparent visual cover that matches with the color scale is arranged on an upper surface of the filter upper cover.

2. The water filter according to claim 1, wherein the rear end of the connecting rod is disc-shaped, surface of the disc being orthogonal with the water surface of the before-filtering water cavity; wherein the color scale is arranged on a section of an arc surface at the top edge of the disc; wherein the water filter is adapted such that, when the floating ball floats up and down along with the water level the color scale on the top edge arc surface of the disc rotates revealing an arc track along with the floating ball, when the floating ball is at a low water level, the color scale rotates and leaves the transparent visual cover, and when the floating ball is at a high water level the color scale rotates into the visible range of the transparent visual cover.

3. The water filter according to claim 2, wherein the water filter is a plug-in one, and the filter cartridge is a water filtration piece shaped like a plug-in card.

4. The water filter according to claim 1, wherein the connecting rod is entirely rod-shaped, with the aid of a hinge joint located at its root, the said color scale is arranged on an arc strut connected with the connecting rod, when the floating ball is at the low water level, the color scale leaves the transparent visual cover, when the floating ball is at the high water level, the color scale enters the visible range of the transparent visual cover.

5. The water filter according to claim 4, wherein the water filter is a plug-in one, and the filter cartridge is a water filtration piece shaped like a plug-in card.

6. The water filter according to claim 1, wherein the water filter is a plug-in one, and the filter cartridge is a water filtration piece shaped like a plug-in card.

7. A method of enabling a water filter to provide alarm for indicating blockage of a filter cartridge thereof, wherein the water filter comprises a filter main body with the replaceable filter cartridge provided therein, a before-filtering water cavity arranged at a water inlet of the filter cartridge, water level of the before-filtering water cavity rises due to the blockage of the filter cartridge; the method comprising the following steps:

A. The before-filtering water cavity is accommodated with a floating-ball-type indicating apparatus which comprises a floating ball, a connecting rod and a color scale, wherein the connecting rod is mounted rotatably on an inside vertical wall of the filter main body or an inner surface of the filter upper cover with the help of a hinge support, wherein the floating ball is arranged at the front end of the connecting rod and the color scale is provided on the connecting rod;

B. Arranging a transparent visual cover that matches with the color scale on the upper surface of a filter upper cover adapted to cover a top of the filter main body;

C. When the color scale is observed through the transparent visual cover from the outside of the filter upper cover, it means that the filter cartridge is blocked up and shall be replaced.

8. A method of enabling the water filter to provide alarm according to claim 7, wherein,
in step A, the rear end of the connecting rod is disc-shaped, surface of the disc being orthogonal with the water surface of the before-filtering water cavity, and the color scale is arranged on a section of arc surface at the top edge of the disc;
when the floating ball floats up and down along with the water level, the color scale on the top edge arc surface of the disc rotates revealing an arc track along with the floating ball;
when the floating ball is at the low water level, the color scale rotates and leaves the transparent visual cover; and
when the floating ball is at the high water level, the color scale rotates into the visible range of the transparent visual cover.

9. A method of enabling the water filter to provide alarm according to claim 7, wherein,
in step A, the connecting rod is entirely rod-shaped;
with the aid of a hinge joint located at its root, the color scale is arranged on an arc strut connected with the connecting rod;
when the floating ball is at a low water level, the color scale leaves the transparent visual cover; and
when the floating ball is at a high water level, the color scale enters the visible range of the transparent visual cover.

10. A method of enabling the water filter to provide alarm according to claim 7, wherein, the color scale is red.

11. A method of enabling the water filter to provide alarm according to claim 7, wherein, the water filter is a plug-in one, and the filter cartridge is a water filtration piece shaped like a plug-in card.

* * * * *